(12) United States Patent
Prusia et al.

(10) Patent No.: US 6,269,777 B1
(45) Date of Patent: Aug. 7, 2001

(54) LOCKING LEASH AND COLLAR SYSTEM

(75) Inventors: Christian Prusia; Shanin Prusia, both of 6634 SE. 39th Ave., Portland, OR (US) 97202; Phillip Salvatori, Salem, OR (US)

(73) Assignees: Christian Prusia; Shanin Prusia, both of Portland, OR (US)

( * ) Notice: Subject to any disclaimer, the term of this patent is extended or adjusted under 35 U.S.C. 154(b) by 0 days.

(21) Appl. No.: 09/669,085

(22) Filed: Sep. 25, 2000

(51) Int. Cl.[7] .................................................. A01K 27/00
(52) U.S. Cl. ............................................................. 119/792
(58) Field of Search .................................... 119/769, 772, 119/792, 793, 795, 856; 70/6, 15, 16

(56) References Cited

U.S. PATENT DOCUMENTS

| | | | |
|---|---|---|---|
| 2,469,592 | * 5/1949 | Byer | 70/15 |
| 3,841,118 | * 10/1974 | Stone | 70/15 |
| 5,743,216 | * 4/1998 | Holt, Jr. | 119/793 |
| 5,794,461 | * 8/1998 | Smith | 70/16 |
| 6,095,094 | * 8/2000 | Phillips | 119/792 |

* cited by examiner

Primary Examiner—Charles T. Jordan
Assistant Examiner—Elizabeth Shaw
(74) Attorney, Agent, or Firm—Kolisch, Hartwell, Dickinson, McCormack & Heuser, P.C.

(57) ABSTRACT

A locking system for pets. The system includes a locking leash assembly comprising a leash with a pet-securing region and a handle region. The handle region is adapted to be held by a user. The pet-securing region includes a lock assembly having a locked configuration and an unlocked configuration. In the locked configuration the lock assembly is adapted to secure together spaced-apart portions of the pet-securing region, thus defining a closed perimeter. The closed perimeter is sized to extend around a portion of a pet and configured to prevent removal of the leash from the pet. The lock assembly in the unlocked configuration is adapted to permit the release of the spaced-apart portions of the pet-securing region. In some embodiments, the leash includes a coupling structure adapted to be removably interlocked to a pet collar.

36 Claims, 6 Drawing Sheets

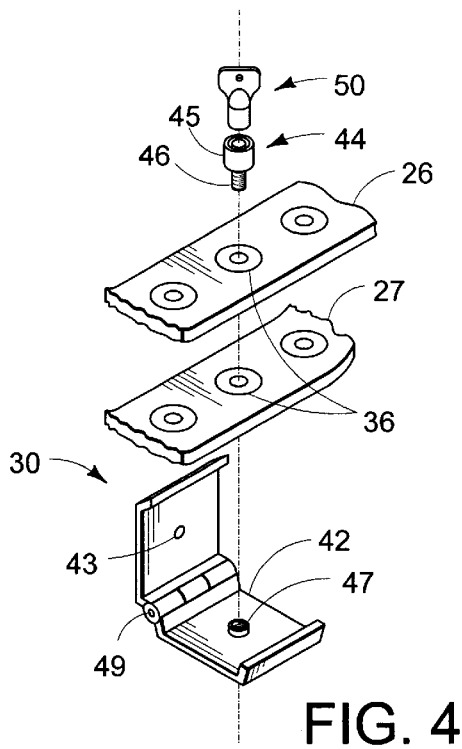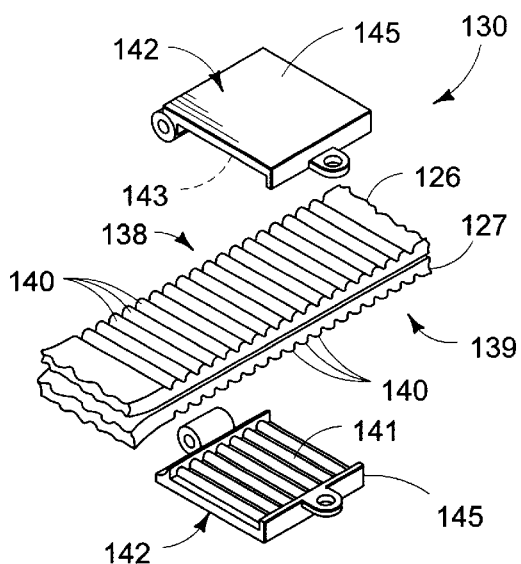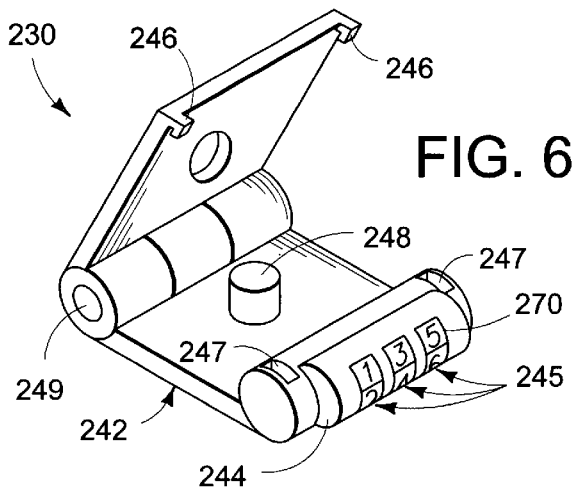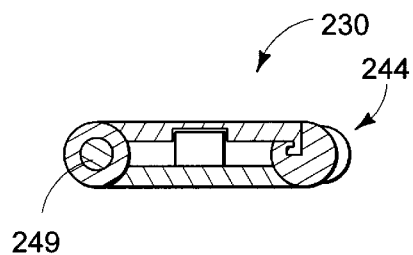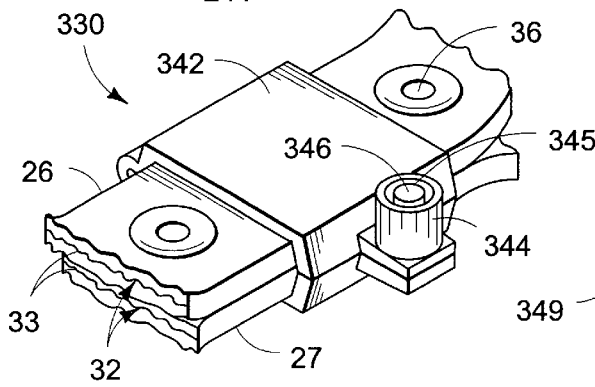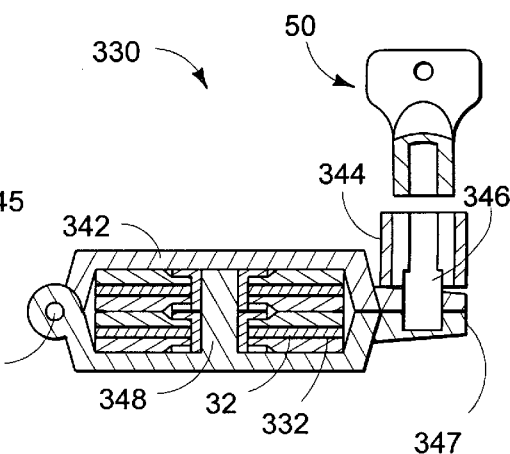
FIG. 4
FIG. 5
FIG. 6
FIG. 7
FIG. 8
FIG. 9

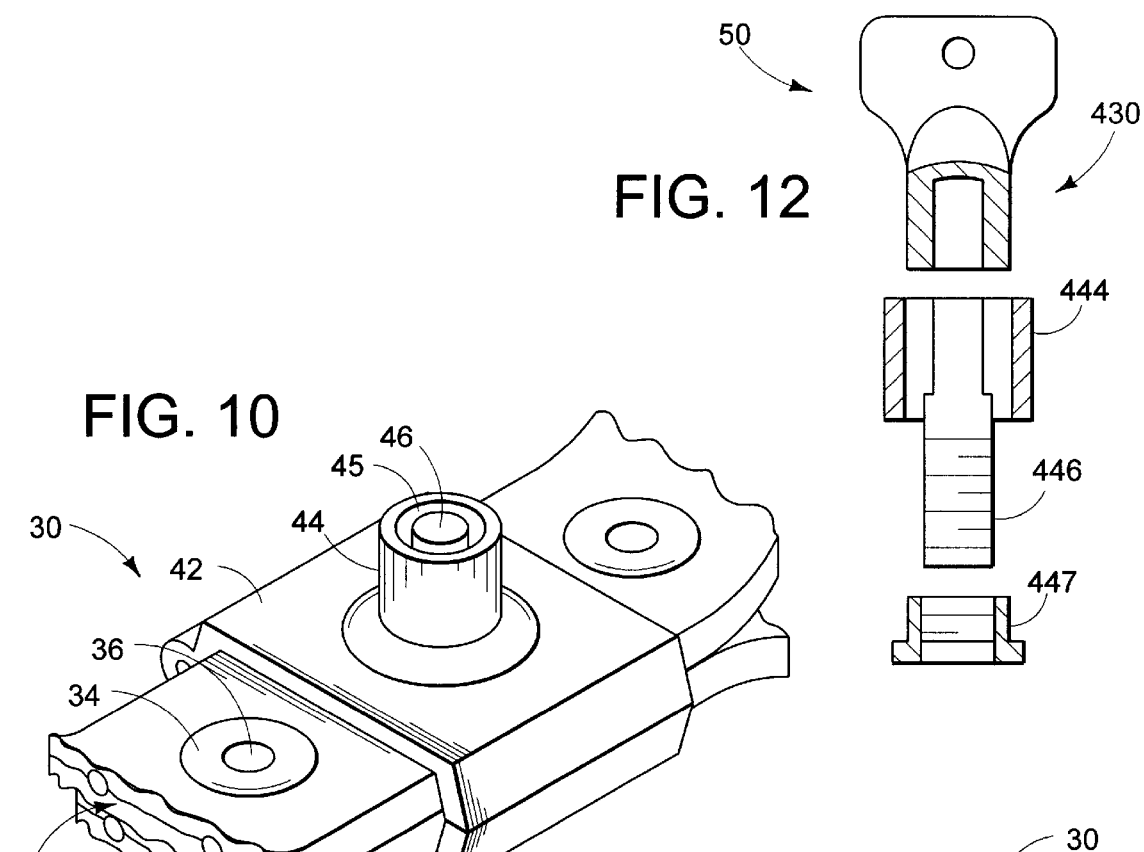
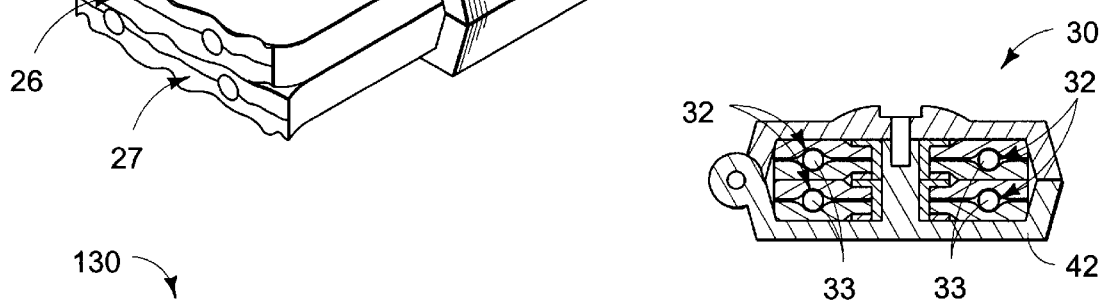
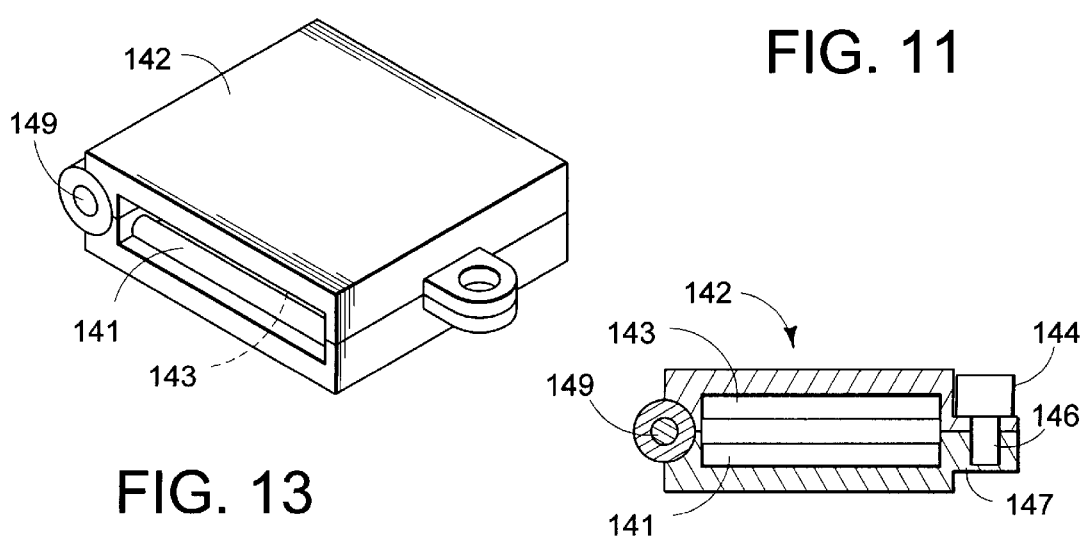

ial removal. The conventional leash is not suited to the task because any person, authorized or not, can easily remove it from the pet, and take the pet away from the fixed object.

LOCKING LEASH AND COLLAR SYSTEM

TECHNICAL FIELD

The present invention relates generally to pet leashes, and more particularly to locking pet leashes.

BACKGROUND OF THE INVENTION

Pet owners often use leashes when walking their pets. One end of the leash is connected to the pet's collar or harness, the other is held by the user. Frequently, the pet owner desires to temporarily connect the leash to a fixed object such as a post or a tree, so that the pet can be left restrained and unattended.

In recent years the theft of pets has increased. As a result of pet thefts the need has arisen for a device that can be used to secure a pet to a fixed object and prevent unauthorized removal. The conventional leash is not suited to the task because any person, authorized or not, can easily remove it from the pet, and take the pet away from the fixed object.

SUMMARY OF THE INVENTION

The present invention includes a locking system for pets. The system includes a locking leash assembly comprising a leash with a pet-securing region and a handle region. The pet-securing region includes a lock assembly having a locked configuration and an unlocked configuration. In the locked configuration, the lock assembly is adapted to secure together spaced-apart portions of the pet-securing region, thus defining a closed perimeter. The closed perimeter is sized to extend around a portion of a pet and configured to prevent removal of the leash from the pet. The lock assembly in the unlocked configuration is adapted to permit the release of the spaced-apart portions of the pet-securing region. In some embodiments, the leash includes a coupling structure adapted to be removably interlocked to a pet collar.

DETAILED DESCRIPTION OF THE DRAWINGS

FIG. 4 is an exploded fragmentary perspective view of the lock mechanism of FIG. 1.

FIG. 5 is an exploded fragmentary perspective view of another embodiment of a locking leash assembly according to the present invention.

FIG. 6 is a perspective view of another embodiment of a lock assembly according to the present invention in an unlocked configuration.

FIG. 7 is a sectional view of the lock assembly of FIG. 6 in a locked configuration.

FIG. 8 is a fragmentary perspective view of another embodiment of a locking leash assembly according to the present invention.

FIG. 9 is a sectional view of the locking leash assembly of FIG. 8.

FIG. 10 is a fragmentary perspective view of another embodiment of a locking leash assembly according to the present invention.

FIG. 11 is a sectional view of the locking leash assembly of FIG. 10.

FIG. 12 is an exploded view of a lock assembly that does not clamp around the leash.

FIG. 13 is a perspective view of a ribbed compression clip lock.

FIG. 14 is a side view of the ribbed compression clip lock of FIG. 13.

DETAILED DESCRIPTION OF THE PREFERRED EMBODIMENTS AND BEST MODE OF THE INVENTION

Figure 1:
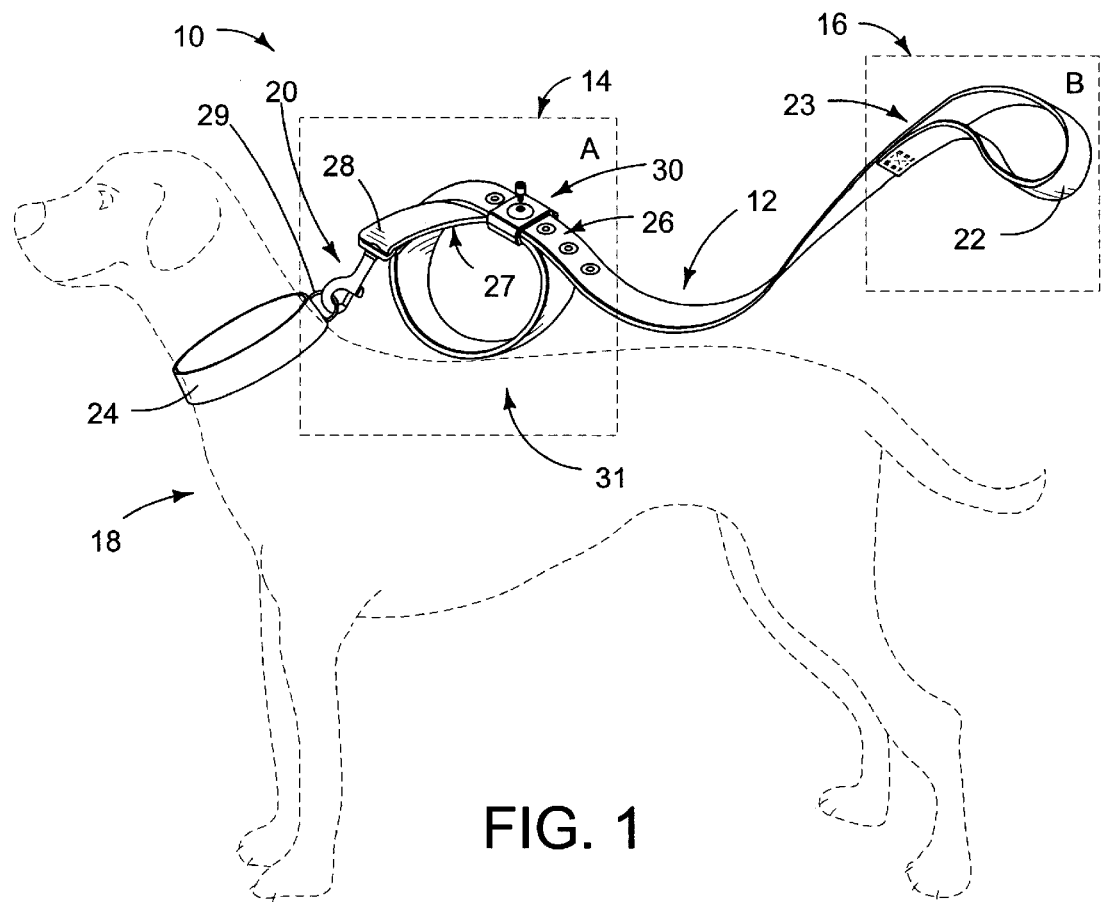
FIG. 1 is a perspective view of a locking leash assembly according to the present invention.

A locking system for pets constructed according to the present invention is shown in FIG. 1 and generally indicated at 10. Locking system 10 includes an elongate leash 12 having a pet-securing region 14 shown within dashed box A of FIG. 1, and a handle region 16 shown within dashed box B of FIG. 1. As shown, the locking system is attached to a pet 18 with a coupling structure 20. In FIG. 1, pet 18 is a dog. It should be understood that locking system 10 may be made to accommodate pets of varying sizes and types including all species of domesticated and other animals.

Figure 2:
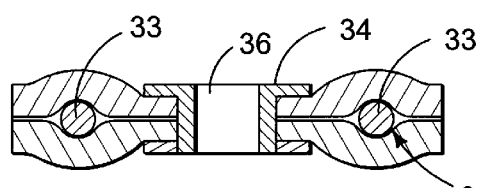
FIG. 2 is a sectional view of the leash assembly of FIG. 1.

Leash 12 can be made of any suitable material. Examples of suitable materials include, but should not be limited to, nylon web, leather, textiles, metallic material and combinations thereof. Leash 12 is flexible and preferably incorporates a reinforcing structure, such as illustrated in FIGS. 2 and 9. The reinforcing structure is incorporated to prevent the leash from being severed, such as with a knife or other cutting tool. The reinforcing structure can be any suitable material, such as a high strength polymer, a composite, or a metallic material that resists cutting. The reinforcing structure 32 of FIG. 2 is shown generally as a pair of cables 33 extending the length of leash 12. It should be understood that reinforcing structure 32 may be a single cable or multiple cables. Cables 33 can be made of any suitable material that resists or prevents severing. The reinforcing structure can also be configured as a layer of material that resists cutting as shown at 332 in FIG. 9. It should be understood that reinforcing structure 332 may be a single layer of sever resistant material or multiple layers of sever resistant material.

In FIG. 1, pet-securing region 14 is located within dashed box A and handle region 16 is located within dashed box B.

The handle region is typically configured as a handle 22 formed from a segment of elongate leash 12 closed into a loop located at a first end, or upper end, 23. As shown, the closed loop of handle 22 is secured back on itself. It should be understood that handle 22 may take any suitable form and structure sufficient to provide a user-grippable region to hold the leash while in use, such as molded handles, handles that incorporate a recoil mechanism, and handles that are separately formed and subsequently secured to end 23 of leash 12.

Figure 3:
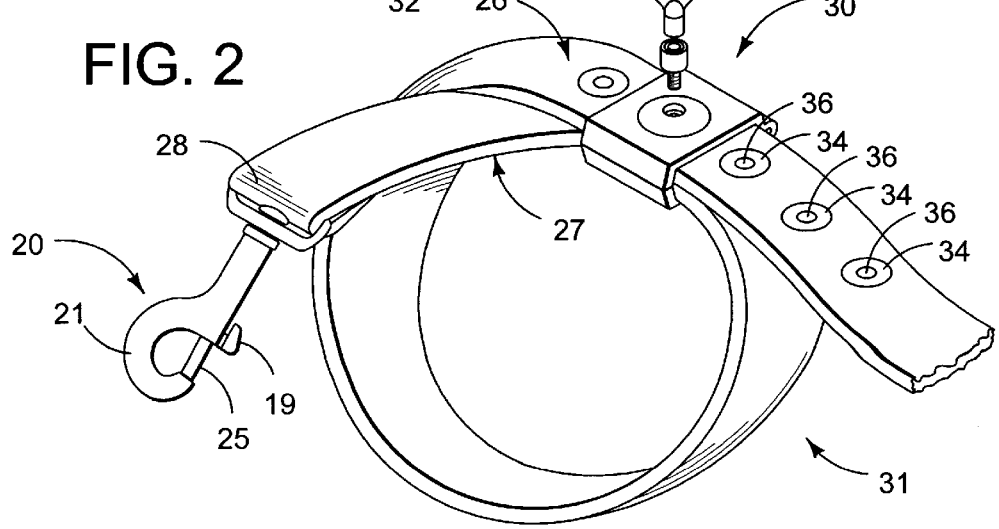
FIG. 3 is an enlarged perspective view of the portion of the leash assembly shown inside box A of FIG. 1.

In FIG. 3, an illustrative embodiment of pet-securing region 14 is shown in detail. The pet-securing region includes a lower, or free end region, 28, a coupling structure 20, and a lock assembly 30. Free end region 28 is the end region of elongate leash 12 distal handle region 16. Coupling structure 20 is attached to free end region 28, and is adapted to releasably couple to a portion of the pet's collar 24, such as ring 29, which is shown in FIG. 1. As shown, collar 24 is a conventional collar designed to extend around a pet's neck. It may also include a harness designed to secure around the torso of a pet, or any other suitable means for restraining a pet.

Coupling structure 20 may be any suitable mechanism for selectively engaging and disengaging leash 12 to the pet's collar 24 without locking the leash to the collar. By "locking," it is meant that a key element is required to separate the joined portions from a locked configuration, as opposed to "releasably coupling," in which no key element is required. A key element is a device, or proprietary information that prevents unauthorized removal or opening of a "locking" mechanism. The key element could be said to provide only limited access or authority to open the lock assembly; by contrast anyone, authorized or not, can separate joined portions from a releasably coupled configuration.

As shown, in FIGS. 1 and 3, coupling structure 20 is a spring biased clip. As shown in FIG. 3, the clip includes a sliding retention pin 25, a finger tab 19 operatively linked to the retention pin, and a C-shaped retention loop 21 adapted to cooperate with the retention pin to form a closed retention loop. The sliding retention pin 25 is biased toward the C-shaped retention loop 21 by a spring (not shown), forming a closed loop. The user opens the closed loop by sliding finger tab 19 away from retention loop 21. Finger tab 19 is operatively linked to retention pin 25 such that when finger tab 19 moves away from retention loop 21, retention pin 25 also moves away from retention loop 21. When retention pin 25 moves away from retention loop 21 an opening is provided which the user can use to hook the retention loop around an attachment point. The attachment point can be any suitable structure sized to fit within the retention loop. As shown in FIG. 1, the attachment point is a ring indicated at 29.

It should be understood that any other suitable mechanism for releasably coupling leash 12 to collar 24 may be used, including, but not limited to, different spring biased clip structures, unbiased clips, and snap lock type mechanisms. It should also be understood that leash 12 may be formed without coupling structure 20. However, inclusion of coupling structure 20 may be preferred so that the leash may be selectively coupled to collar 24 without utilizing the subsequently described lock assembly. Coupling structure 20 typically is independent of, or at least independently operable from, the subsequently described lock assembly.

Referring to FIGS. 1 and 3, spaced-apart portions 26 and 27 of pet-securing region 14 are shown locked together by lock assembly 30. Locking system 10 allows a pet owner to effectively lock leash 12 to their pet. This is achieved by encircling a portion of the pet, such as the pet's neck or torso, with a defined closed loop 31 of sufficient circumference to prevent the encircled portion of the pet from being removed therefrom. As shown, loop 31 is formed by coiling the pet-securing region 14 back onto itself, lining up spaced-apart portions 26 and 27, and securing them together with lock assembly 30. Portions 26 and 27 may be defined locations on the leash, or may be selected by the user from a plurality of possible portions along the length of region 14 such as to vary with the perimeter of the portion of the pet to be encircled.

As perhaps best seen in FIG. 3, the spaced-apart portions include at least one aperture 36 located on each of the spaced-apart portions 26 and 27. More preferably, the embodiment shown in FIG. 3 includes a plurality of apertures 36 along at least one of the spaced-apart portions 26 and 27. As shown, the apertures are reinforced by grommets 34. The plurality of apertures 36 are spaced along one or both of the spaced-apart portions 26 and 27 of the pet-securing region 14 in order to allow the coiled loop formed when the two spaced-apart portions are secured together to vary in perimeter, thereby accommodating pets having varying sizes of necks or other body portions to be encircled by the leash.

Alternative structures to apertures 36 may be incorporated to prevent lateral movement of the spaced-apart portions of pet-securing region 14. For example, pet-securing region 14 may include at least one nesting surface that is adapted to mechanically prevent lateral movement of spaced-apart portions relative to each other when biased together.

An illustrative example of such a nesting surface is shown in FIG. 5, in which upper and lower nesting surfaces are indicated respectively at 138 and 139. The nesting surfaces include a plurality of interlocking structures, such as protrusions, or ribs, 140. The nesting surfaces may be located at discrete points along pet-securing region 14 or may be continuous along the region. As seen in FIG. 5, the subsequently described lock assembly includes upper nesting surface 141 and lower nesting surface 143 adapted to interlock with protrusions or ribs 140, thus preventing lateral motion. Alternatively, nesting surfaces 138 and 139 may be positioned to engage each other, with the lock mechanism urging the surfaces together to prevent translation thereof along the length of the leash.

The operation of the lock assembly will best be understood by a description of the elements that comprise the lock assembly and how these elements interact. The lock assembly described herein refers generally to the portion of the locking system 10 that secures the spaced-apart portions 26 and 27 together. The lock assembly is the generic term to refer to all of the various structures and elements that work together to lock the present invention to the pet. Lock assembly 30 may include any suitable lock structure. FIGS. 4–14 illustrate nonlimiting examples of different embodiments of suitable lock structures. Each of the embodiments includes a key structure, a key element, and can be selectively reconfigured from a locked configuration to an unlocked configuration when the key element cooperates with the key structure.

The lock structure, as used herein, refers to the structural elements that hold the spaced-apart portions 26 and 27 of securing region 14 together. The lock structure contains a means for biasing together the spaced-apart portions. The lock structure may include a clamp, a loop, a retention pin, or any other suitable structure that can be used to secure spaced-apart portions together.

The key structure is that portion of the lock assembly that enables the lock assembly to reconfigure from a locked to an unlocked configuration. For example, in a combination pad lock the key structure includes the combination dial, the internal tumblers, and the retention bolt that is held in place by the internal tumblers. In a Yale® type lock the key structure includes the rotating cylinder, the tumbler pins, the pin recesses, and the retention bolt. In any type of lock assembly, the key structure includes the elements that cooperate to prevent the lock assembly from opening when in the locked configuration, and also cooperate with the key element to reconfigure the lock assembly into the unlocked configuration.

The key element is the device, signal or proprietary information that is used to manipulate the key structure and enable the reconfiguration of the lock assembly from the locked to the unlocked configuration. Examples of suitable key elements include cylindrical keys, flat serrated keys, magnetic keys, combinations or proprietary information, electronic signals, and combinations thereof. Magnetic keys are structures that manipulate tumblers inside the lock with variations in the magnetic field. This manipulation is accomplished by holding the magnetic key in the correct position on the outer surface of the lock. Electronic signal keys are like those typically used in car locks, where a transmitter having a button is held and activated by a user and a receiver is housed in the lock assembly and when the correct code is transmitted the lock assembly unlocks. Signal keys and lock assemblies include transmission and reception of RF, or other suitable signals, across the entire spectrum of frequencies and wavelengths.

As discussed, the lock structure locks the spaced-apart portions of the pet-securing region together. The lock structure may also encompass at least a portion, or all, of the key structure. That is to say, the key structure may be fully or partially contained within the lock structure. For example, in a combination pad lock, the lock structure would include the U-shaped bolt that extends out of the dial housing and the top portion of the dial housing. The key structure of the combination pad lock would include the outer dial, all the internal tumblers, and the notched portion of the U-shaped bolt. Finally, the key element of the combination pad lock is the combination itself That is, the actual information the user calls upon to know at what numbers on the outer dial to reverse direction, leaving the tumblers in the proper alignment to release the U-shaped bolt. Combination pad locks are often used on gym or school lockers.

Another example of the interaction of the various elements of a lock assembly will be helpful. Turning to a lock assembly with a Yale® type locking system, the lock structure includes the housing knob assembly. In this system the key structure is contained entirely within the lock structure or housing assembly. The key structure includes the rotating cylinder having a key slot, the tumbler pins, the pin recesses, and the retention bolt. The key element in a Yale® type lock is a flat metal structure with one or more serrated edges and/or faces. When the key element is inserted into the key slot, the tumbler pins are raised to the proper height by the serrations, making it possible to rotate the cylinder and move the retention bolt. Yale® type locks are often used on doors of houses.

Another type of lock structure is a threaded friction fit lock structure. This type of lock structure may include a cylindrical key element. In this example, the lock structure may be adapted to house at least part of the key structure. The key structure includes a rotating head, an internal threaded shaft, and a threaded receiver. The rotating head and the top of the internal threaded shaft are concentric, having a circular space between them. The internal threaded shaft and the rotating head include a pattern of grooves facing the circular space between them. The key element of the present lock type is a cylindrical structure sized to fit within the circular space separating the internal threaded shaft and the rotating head. The cylindrical structure includes raised portions adapted to fit into the grooves, thereby linking the internal threaded shaft with the rotating head and permitting rotation of the shaft for removal from the threaded receiver. Threaded friction fit lock structures are often used, for example, on vending machines and KRYPTONITE® bike locks.

The preceding examples should explain the workings of the lock structure, key structure, and the key element. It should be noted that other types of lock assemblies employing different types of lock structures, key structures, and key elements are contemplated by the present invention. For example, but not limited to, a magnetic lock assembly, an electronic lock assembly, and variations of mechanical combination and key type lock assemblies.

Turning to FIGS. 4, 10 and 11, an embodiment of the lock assembly is shown at 30. In FIG. 4, spaced-apart portions 26 and 27 are shown above lock assembly housing 42, which is a part of the lock structure. A tumbler portion, or rotatable head, 44 of the key structure is attached to an internal threaded pin 46. In this embodiment, a threaded receiver 47 of the key structure is incorporated into housing 42. Tumbler portion 44 is rotatably mounted to threaded pin 46. Threaded pin 46 passes through the top of housing 42 at an aperture 43, through apertures 36 in spaced-apart portions 26 and 27, and engages threaded receiver 47 in the lower portion of housing 42. The key element of lock assembly 30 includes a cylindrical key element 50 that fits within a generally circular recess 45 and links tumbler portion 44 with threaded pin 46 so that the pin can be removed from threaded receiver 47, unlocking lock assembly 30. It should be understood that this is an example of a friction fit type of lock structure, as previously described. Lock assembly 30 prevents the two spaced-apart portions 26 and 27 from moving relative to one another because the threaded pin 46 passes through apertures 36 in the spaced-apart portions. The exploded view of lock assembly 30 shown in FIG. 4 illustrates the lock assembly in the unlocked configuration.

Referring to FIG. 10, lock assembly 30 is shown in the locked configuration with tumbler 44 freely rotatable about threaded pin 46 such that when the tumbler is rotated, the threaded pin does not rotate and therefore cannot be removed from threaded receiver 47 of lock assembly housing 42. When key element 50 is inserted into recess 45 and turned, this turns both tumbler 44 and threaded pin 46, disengaging the threaded pin from threaded receiver 47 and unlocking lock assembly 30. A cross section of lock assembly 30 is shown in FIG. 11 in the unlocked configuration with tumbler 44 and threaded pin 46 removed. Receiver 47 may alternatively include projections adapted to selectively engage portions of pin 46 depending upon the rotation and position of the pin.

Referring to FIGS. 5, 13 and 14, another exemplary embodiment of the lock assembly of the present invention is shown generally at 130. This embodiment includes a housing 142 adapted to engage and nest into the surface regions 138 and 139 of spaced-apart portions 126 and 127. As shown, housing 142 includes hinged portions 145, joined by a pin (not shown). Portions 126 and 127 include surface regions 138 and 139 with protrusions, or ribs, 140 extending therefrom. Lock assembly 130 prevents spaced-apart portions 126 and 127 from moving relative to one another by providing a clamping force that biases spaced-apart portions 126 and 127 together. Additionally, housing 142 includes nesting surfaces 141 and 143 having protrusions that nest into the protrusions of surface regions 138 and 139. This nesting action provides a mechanical interlock between housing 142 and spaced-apart portions 126 and 127 that increases the effectiveness of the clamping force and, more effectively, prevents relative motion between the two portions. Alternatively, housing 142 may be adapted to compress protrusions on portions 126 and 127 together, without housing 142 itself including protrusions on surfaces 141 and 143.

Surfaces 141 and 143 interact with surfaces 138 and 139 to form a mechanical interlocking friction fit that prevents the horizontal movement of the spaced-apart portions 126 and 127, as shown in FIG. 5. The surfaces 141 and 143 nest into 138 and 139 to form the interlocking fit. Lock assembly 130 in a closed configuration and unlocked is illustrated in FIG. 13. In the closed and locked configuration of lock assembly 130, threaded pin 146 is screwed into threaded hole 147 of housing 142 and tumbler 144 freely rotates about threaded pin 146 so that it cannot be unscrewed from threaded hole 147, such as shown in FIG. 14. It should be noted that other lock structures including a removable conventional pad or key lock could be used to secure lock assembly 130 through hole 147.

While the key element shown in one embodiment of the present invention is a cylindrical key and the key structure shown is a threaded friction fit configuration, a tumbler pin and cylinder Yale® type key structure could be used with a standard Yale® type key element. Other conventional lock structures may be used in place of pin 46 and tumbler 44, such as a magnetic key element with a magnetic key structure or an electronic receiver type key structure that works in conjunction with a coded RF or other suitable signal key element to unlock the lock assembly.

Another example of a combination type lock assembly is shown in FIGS. 6 and 7. Lock assembly 230 includes housing 242, tumbler assembly 244, rotating dials 245, and latch prongs 246. This embodiment employs a combination as the key element that works in conjunction with the key structure to change the lock assembly from the locked to the unlocked configuration. The key structure of this embodiment comprises tumbler assembly 244, rotating dials 245, and latch prongs 246.

In the locked configuration shown in FIG. 7, latch prongs 246 are inserted into notches 247 of housing 242. Although a pair of prongs 246 are shown, it is within the scope of the present invention that any number of prongs and notches or other suitable mating structures may be used. Mechanical retainers engage latch prongs 246, locking lock assembly 230 to prevent it from opening and releasing spaced-apart portions 26 and 27.

Rotating dials 245 are marked with any suitable indicia 270, shown in FIG. 6 as numbers. The indicia can be any distinguishing marking that delineates one circumferential portion of the dial from another. For example, indicia may include letters, images, patterns, numbers, shapes, symbols and colors or any combinations thereof. The dials are rotatably mounted within housing 242 at tumbler assembly 244. Internal tumblers are actuated by rotating dials 245 from one indicia marking to the next. When indicia 270 on dials 245 are positioned to correspond to the present combination, the internal tumblers (not shown) release the mechanical retainers engaging latch prongs 246, causing the lock assembly to unlock.

In lock assembly 230 of FIGS. 6 and 7, the key element is the actual knowledge of the combination, or correct position, of dials 245. Lock assembly 230 is shown in the closed and locked position in FIG. 7. It should be understood that alternative combination key structures can be used, including a combination lock with a single dial that rotates clockwise and counter clockwise aligning three or more internal tumblers, and key pad type combination locks.

In the embodiment of housing 242 shown in FIGS. 6 and 7, the housing includes pin 248 that passes through apertures 36 in spaced-apart portions 26 and 27, preventing them from moving laterally relative to one another. It should be noted that the key structure of lock assembly 230, namely tumbler assembly 244, rotating dials 245, and latch prongs 246, can be used with the housing 142 of FIGS. 5 and 17, to engage spaced-apart portions 126 and 127 in the same manner as detailed above when referring to lock assembly 130 discussing the mechanically interlocking friction fit.

Another illustrative example of a suitable lock assembly is shown in FIGS. 8 and 9 at 330. Lock assembly 330 has a lock structure including a housing 342, a retention pin 348, a circular recess 345, hinge 349, a key structure including a tumbler portion 344, a threaded pin 346, and a threaded securing hole 347. In this embodiment of the lock assembly the threaded securing portion is located adjacent to spaced-apart portions 26 and 27 and threaded pin 346 does not pass through apertures 36. Retention pin 348 passes through apertures 36 in spaced-apart portions 26 and 27, preventing lateral movement. The key element of lock assembly 330 is shown as a cylindrical key at 50, although any of the other key structures and elements discussed herein may be used. As mentioned previously, FIG. 9 shows reinforcing structure 32 as a layer 332 of material that resists severing.

An example of a lock assembly that does not extend around spaced-apart portions of leash 12 is shown in FIG. 12 at 430. Lock assembly 430 is shown including key element 50, and a key structure. Note, in this embodiment of the lock assembly there are no structural elements that make up a lock structure that are not also a part of the key structure. That is to say that in this embodiment the lock structure and the key structure have merged. The key structure includes rotating tumbler 444, threaded locking pin 446, and threaded receiver 447. To secure lock assembly 430 to elongate leash 12, threaded receiver 447 is aligned with one of the apertures 36 of spaced-apart portion 27 of pet-securing region 14, then key element 50 is inserted into recess 445 between tumbler 444 and threaded locking pin 446 to lock them together, such as discussed above with respect to the lock assemblies shown in FIGS. 4, 10 and 11. At this point, when tumbler 444 is rotated it rotates threaded locking pin 446 to screw into threaded receiver 447 and secure lock assembly 430 in the locked configuration or unscrew threaded locking pin 446 out of threaded receiver 447 into the unlocked configuration.

Figure 15:
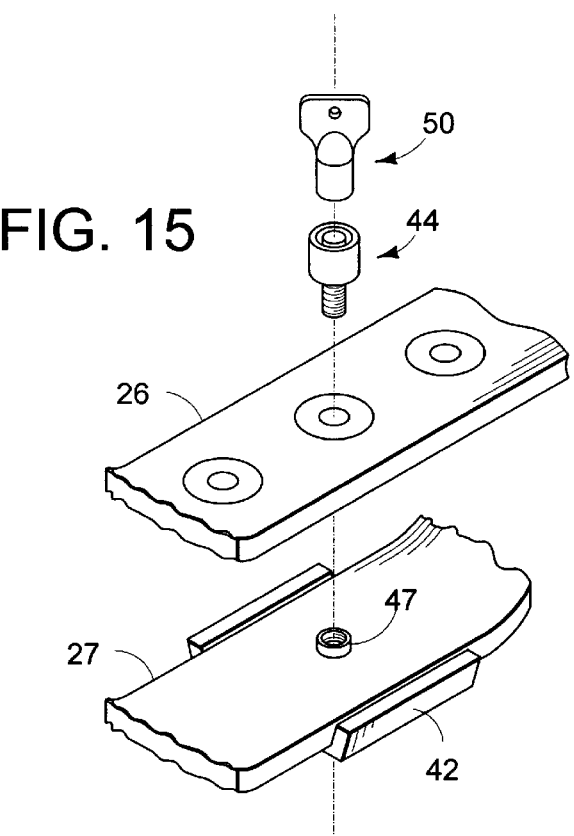
FIG. 15 is an exploded fragmentary perspective view of another embodiment of a locking leash according to the present invention.

Turning to FIG. 15, a lock assembly is shown having a portion 42 of the lock structure integrally or fixedly attached to a spaced-apart portion 27 of pet-securing region 14. The key structure includes rotating tumbler 44, threaded locking pin 46, and threaded receiver 47. The key element is a cylindrical key 50 that cooperates with rotating tumbler 44 and threaded locking pin 46 to unlock the lock assembly as previously described.

Figure 16:
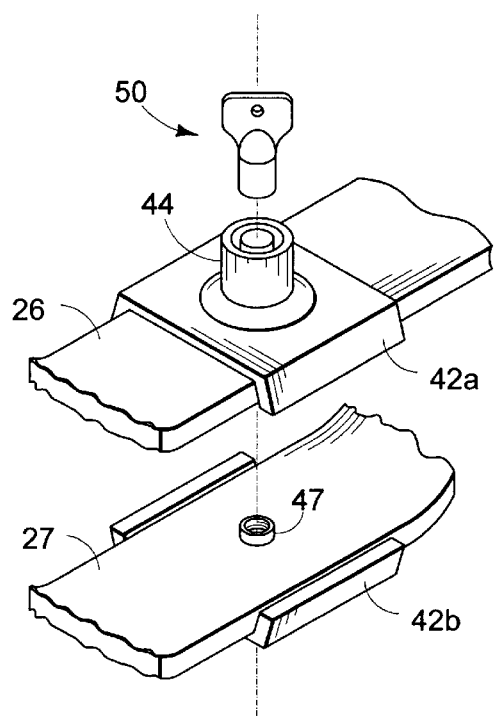
FIG. 16 is an exploded fragmentary perspective view of another embodiment of a locking leash according to the present invention.

In FIG. 16, the lock assembly 30 is shown with portions 42a and 42b of the lock structure fixedly attached to spaced-apart portions 26 and 27, respectively. Elements of the key structure are similarly attached to spaced-apart portions 26 and 27. As shown, rotating tumbler 44 is coupled with portion 42a of the lock structure and fixed to spaced-apart portion 26. Also coupled with portion 42a and extending through portion 26 is threaded locking pin 46. Threaded receiver 47 is an integral part of portion 42b and extends through spaced-apart portion 27.

Figure 17:
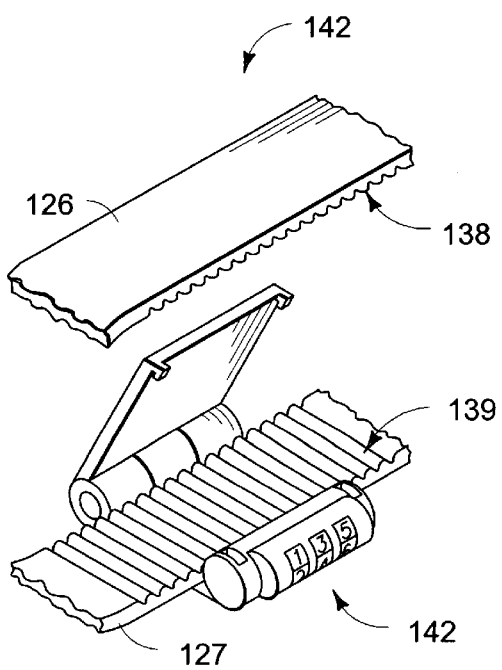
FIG. 17 is an exploded fragmentary view of another embodiment of a locking leash according to the present invention.

Referring to FIG. 17, another embodiment of locking system 10 is shown. The lock assembly includes a lock structure similar to that described previously and shown in FIGS. 5, 13 and 14, in which the lock structure includes nesting surfaces 141 and 143 that interact with spaced-apart portions 126 and 127. Similar to the previously described ribbed method of preventing lateral movement, portions 126 and 127 include nesting surfaces 138 and 139, respectively. It should be noted that portions 126 and 127 may include nesting surfaces on both sides for increased nesting interaction and improved prevention of lateral movement. The key structure incorporated in FIG. 17 operates in the same manner as the key structure described in FIGS. 6 and 7.

Figure 21:
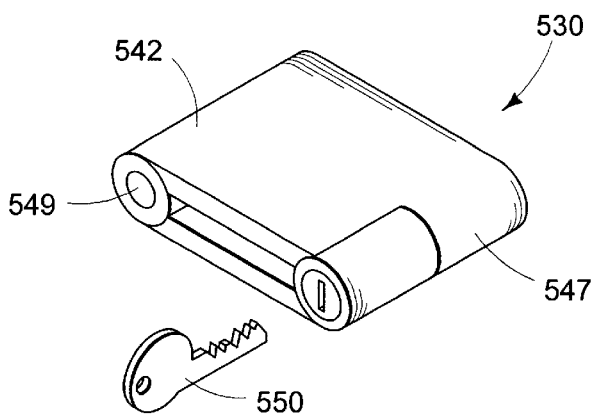
FIG. 21 is a perspective view of another embodiment of a lock assembly according to the present invention, shown in the locked configuration.
Figure 22:
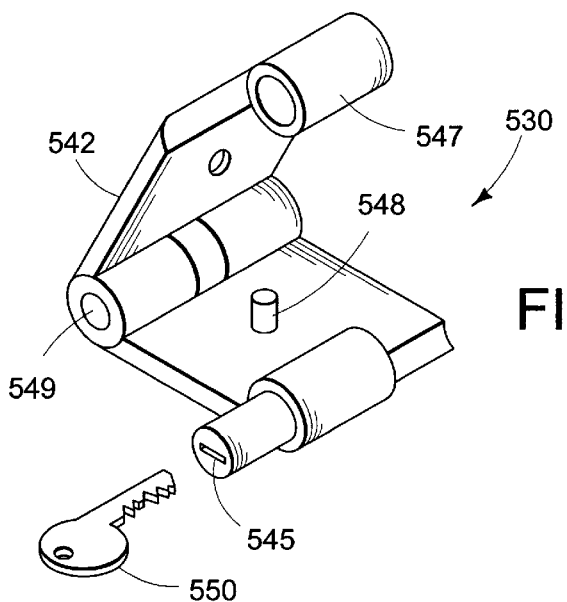
FIG. 22 is a perspective view of the lock assembly of FIG. 21, shown in the unlocked configuration.
Figure 23:
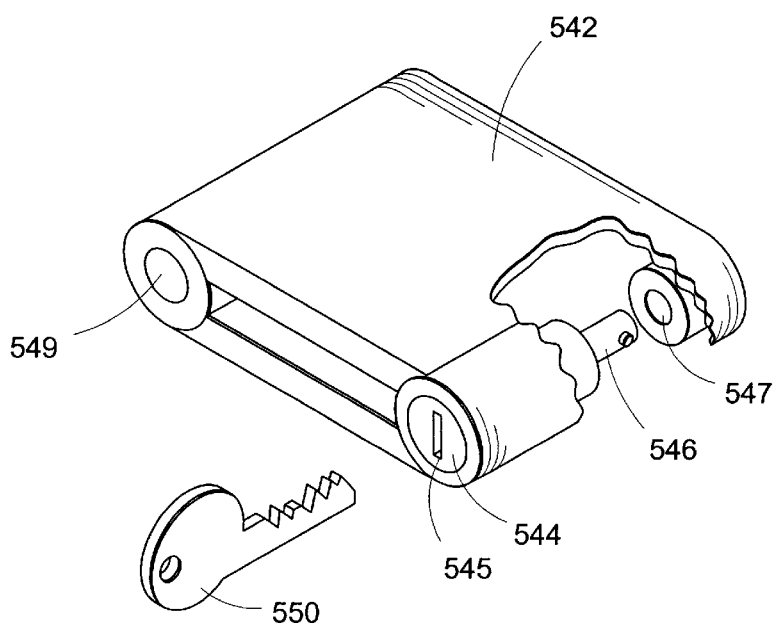
FIG. 23 is a fragmentary perspective view of the lock assembly of FIG. 21.

Referring to FIGS. 21, 22, and 23, another exemplary embodiment of the lock assembly of the present invention is shown generally at 530. The lock structure of this embodiment includes a housing 542 adapted to clamp around the spaced-apart portions 26 and 27 of the pet-securing region, similar to the mechanism described above with reference to FIGS. 6–9. As shown, a retention pin 548 passes through apertures 36 to prevent lateral movement of the spaced-apart portions. It should be understood that lock assembly 530 may alternatively, or additionally, include projections adapted to engage nesting surface type spaced-apart portions 126 and 127 in a manner similar to that described above referring to FIGS. 5, 13, 14 and 17.

The key structure of this exemplary embodiment includes key element recess 545, rotatable tumbler button 544, retention pin 546, and retention pin receiver 547. The key element recess 545 is located on the tumbler button 544. Tumbler button 544 is biased out of housing 542 when the lock assembly is in the unlocked configuration, as shown in FIG. 22. To use lock assembly 530, the user clasps housing 542 around the spaced-apart portions of the leash to be locked together (not shown). This also aligns retention pin 546 with retention pin receiver 547. As shown in FIG. 22, housing 542 includes an optional detent into which receiver 547 is seated when aligned with pin 546. When tumbler button 544 is depressed to the position shown in FIGS. 21 and 23, retention pin 546 extends into retention pin receiver 547 and the lock assembly 530 is reconfigured to its locked configuration.

Similar to the previously described lock assemblies, assembly 530 includes a key element 550 that is adapted to cooperate with recess 545 to reconfigure the lock assembly into the unlocked position. As shown, key element 550 is a generally planar key, however, it should be understood that any other suitable key element may be used. For example, a cylindrical key element, such as shown in FIG. 12, may be used, with recess 545 being shaped to correspond to that type of key element.

In the embodiment shown in FIGS. 21–23, key element 550 is not required to put lock assembly 530 in the locked configuration. Instead, all that is required is the alignment of pin 546 with receiver 547 and the depression of button 544. To reconfigure lock assembly 530 into the unlocked configuration, key element 550 is inserted into recess 545 and the tumbler button 544 is rotated. The rotation releases the retention pin 546 from the retention pin receiver 547 allowing the biased tumbler button 544 to extend out from housing 542 thus reconfiguring the lock assembly 530 into the unlocked configuration shown in FIG. 22.

In the illustrative embodiment shown in FIGS. 21–23, the lock assembly is removable, or separately formed, from the portions of the leash with which it is used. It should be understood that assembly 530 may be fixedly attached to one of the spaced-apart portions, such as described with the lock assembly shown in FIG. 17.

Figure 18:
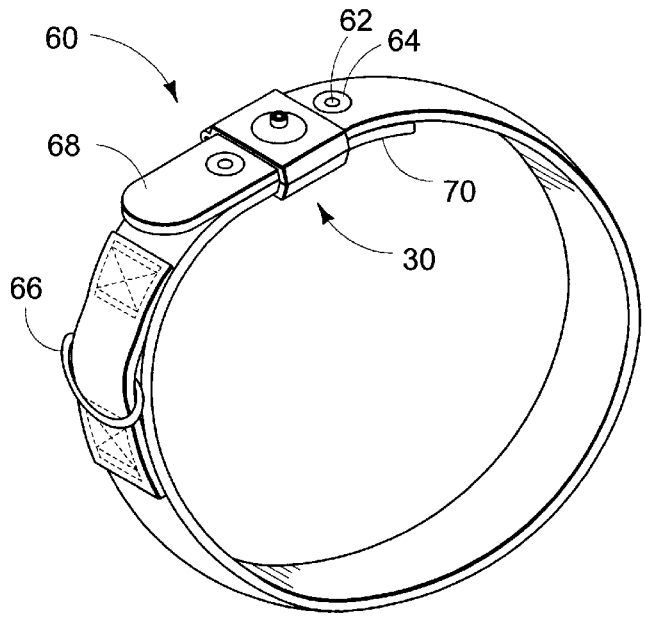
FIG. 18 is a perspective view of an embodiment with a pet collar and a lock assembly securing the collar in place.

In addition to the embodiments of locking system 10 that are adapted for use with a conventional pet collar, the locking system can include a locking pet collar 60, shown in FIG. 18. Locking pet collar 60 includes sizing apertures 62, optional grommets 64, optional coupling structure attachment ring 66, first end 68 and second end 70. A plurality of sizing apertures 62 are located spaced apart at regular intervals at one or both ends 68 and 70 of pet collar 60, and are optionally reinforced by grommets 64. Locking collar 60 can be used with any of the lock assemblies 30, 230, 330, and 430 that are adapted for use with apertures 36 of pet-securing region 14 of elongate leash 12.

It should be understood that the structure shown in FIGS. 5, 13, 14, and 17 could be incorporated in one or both ends 68 and 70 of pet collar 60. The locking structure illustrated in FIGS. 5, 13, 14 and 17, would be used to cooperate with nesting surfaces located along a portion of pet collar 60 to prevent the removal of leash 12. In this embodiment, the securing region of leash 12 will incorporate a nesting surface similar to that shown in FIGS. 5, 13, 14 and 17. The nesting surface of the pet-securing region is aligned with the nesting surface of the pet collar and any of the lock assemblies described in FIGS. 5, 13, 14 and 17 could be used to secure them together.

FIG. 18 shows locking collar 60 secured in a fixed perimeter through apertures 36 with lock assembly 30. The perimeter size of pet collar 60 is adjustable by aligning one of the apertures 62 at each end 68 and 70 of the pet collar such that the perimeter is large enough to secure around a portion of a pet.

Figure 20:
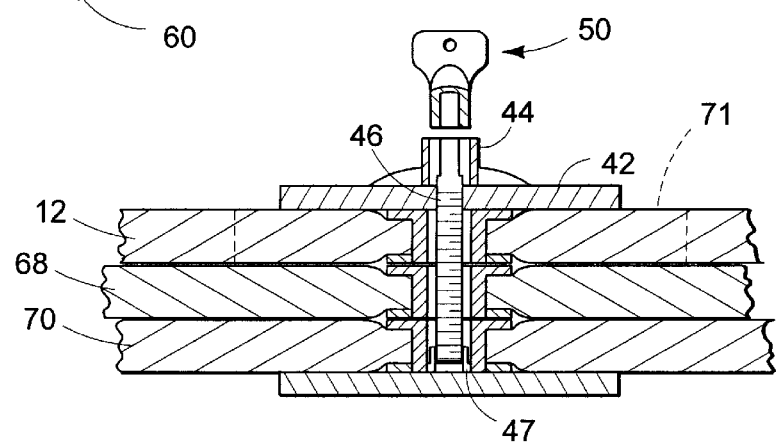
FIG. 20 is a fragmentary sectional view of the collar, leash, and lock assembly locked together.

To secure elongate leash 12 to locking pet collar 60, first lock assembly 30 must be unlocked. Second, an aperture 36 on pet-securing region 14 of elongate leash 12 is aligned over the sizing apertures 62. Locking assembly 30 is then closed and locked, securing elongate leash 12 to locking pet collar 60. To accommodate this configuration lock assembly 30 must be large enough for three layers of material, as shown in FIG. 20, to fit within housing 42. The key structure of lock assembly 30 includes rotating tumbler 44, threaded locking pin 46, and threaded securing receiver 47. The key element that cooperates with the key structure of locking assembly 30 is a cylindrical key 50 that fits into recess 45 to enable rotating tumbler 44 to turn threaded locking pin 46. Housing 42 and threaded locking pin 46 should be sized to accommodate the additional layer of locking system 10 in this embodiment. Alternatively, separate lock assemblies for each function could be used. That is to say, that one lock assembly that is sized for three layers could be used to lock the leash to the two layers of collar and another lock assembly could alternatively be used to lock the spaced-apart portions of the collar around the pet. As a further variation, a lock assembly could be used to lock the collar around the pet, with another lock assembly being used to either lock the leash to the collar or to lock spaced-apart portions of the leash around the pet. If a single lock assembly is used to accommodate the three layers, a spacer 71 may be included to lock the collar to the pet without locking the leash to the pet. An example of a suitable spacer is indicated in FIG. 20 at 71.

Figure 19:
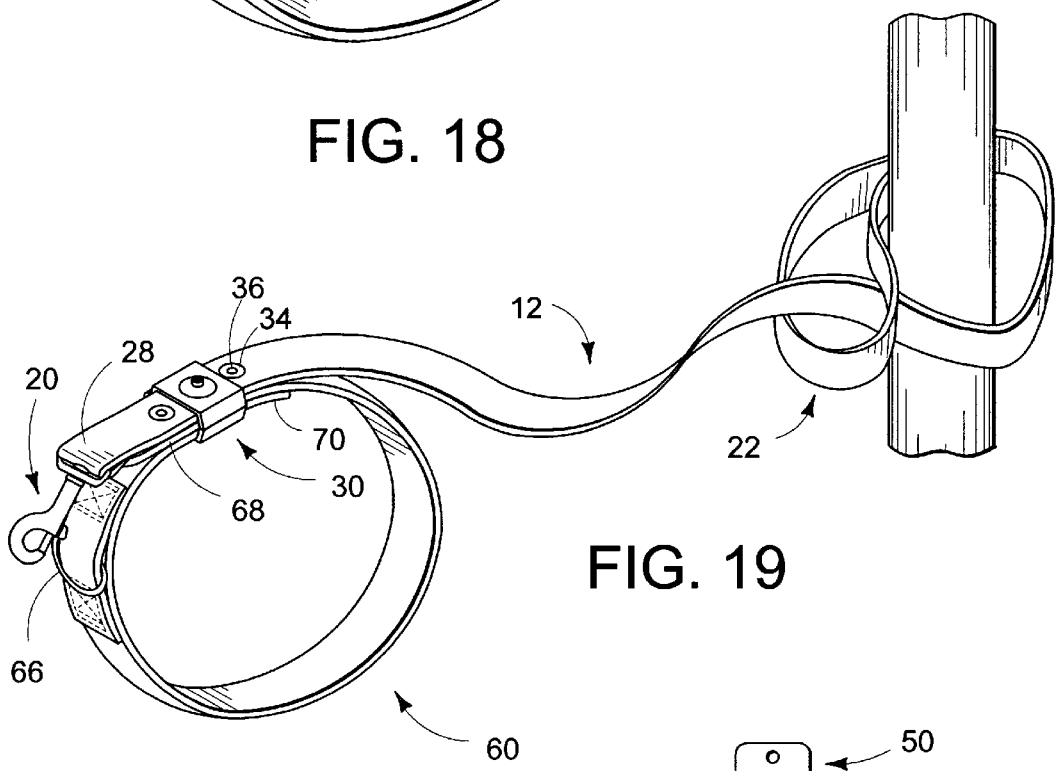
FIG. 19 is a perspective view of the leash secured to a post and the pet collar and both the leash and pet collar locked in place by a lock assembly.

Referring generally to FIG. 1 and specifically to FIG. 19, a pet owner uses locking system 10 to secure their pet first, by unhooking coupling structure 20 from the pet's collar. Second, leash 12 is looped around any suitable fixed object, such as a tree or bike rack, and then the free end 28 is passed through handle 22. Next, the pet owner secures pet 18 to leash 12. This step can be accomplished in one of two ways depending on the type of pet collar. When used in conjunction with a conventional collar, the owner would secure pet 18 to leash 12 by coiling pet-securing region 14 around the pet's neck or any other portion of the pet's body such that the defined closed loop itself forms a collar that cannot be slipped off the pet. The owner then overlaps the two spaced-apart portions 26 and 27 and then locks them together with lock assembly 30.

Alternatively, if the pet owner uses leash 12 with a specialized collar 60 shown in FIG. 18, the pet-securing region 14 can be locked directly to specialized collar 60. Specialized collar 60 includes at least one portion adapted to cooperate with lock assembly 30 to secure pet-securing region 14 to collar 60, as shown in FIG. 19.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A locking system for pets, the system comprising:
   an elongate leash with a pet-securing region and a handle region, wherein the pet-securing region includes a coupling structure adapted to be releasably coupled to a pet collar and the handle region is adapted to be held by a user; and
   a lock assembly including a lock structure, and key structure, and a key element, wherein the lock assembly having a locked configuration and an unlocked configuration, wherein in the locked configuration the lock assembly is adapted to lock together spaced-apart portions of the pet-securing region to define a closed perimeter sized to extend around a portion of a pet configured to prevent removal, wherein in the unlocked configuration the lock assembly is adapted to permit release of the spaced-apart portions of the pet-securing region, and further wherein the coupling structure is independently operable from the lock assembly.

2. The locking system according to claim 1, wherein the elongate leash includes a first end including the handle region and a second end including the coupling structure.

3. The locking system according to claim 1, wherein at least one of the spaced-apart portions includes an aperture through which a portion of the lock assembly extends.

4. The locking system according to claim 3, wherein at least one of the spaced-apart portions includes a plurality of spaced-apart apertures.

5. The locking system according to claim 4, wherein the plurality of spaced-apart apertures extend along the length of the pet-securing region to define different sizes of closed perimeters.

6. The locking system according to claim 3, wherein a portion of the lock structure is fixedly attached to the pet-securing region of the leash.

7. The locking system according to claim 3, wherein the lock structure is fixedly attached to the pet-securing region of the leash.

8. The locking system according to claim 3, wherein the locking assembly is adapted to be selectively removable from the leash.

9. The locking system according to claim 1, wherein the locking assembly is adapted to clamp around the spaced-apart portions of the pet-securing region.

10. The locking system according to claim 9, wherein the locking assembly is adapted to bias together the spaced-apart portions of the pet-securing region to provide a friction fit preventing translational movement.

11. The locking system according to claim 10, further including a nesting surface structure on each of the spaced-apart portions of the pet-securing region.

12. The locking system according to claim 11, wherein the nesting surface structure includes a plurality of interlocking protrusions.

13. The locking system according to claim 1, wherein the leash includes a reinforcing structure adapted to prevent severing.

14. The locking system according to claim 13, wherein the reinforcing structure includes at least one metallic cable.

15. The locking system according to claim 13, wherein the reinforcing structure includes at least one layer of high strength polymeric material.

16. The locking system according to claim 1, wherein the coupling structure includes a spring biased clip.

17. The locking system according to claim 3 wherein the lock assembly further comprises a key structure adapted to cooperate with a key element which enables the lock assembly to change from the locked to the unlocked configuration.

18. The locking system according to claim 9, wherein the lock assembly further comprises a key structure adapted to cooperate with a key element which enables the lock assembly to change from the locked to the unlocked configuration.

19. The locking system according to claim 17, wherein the key structure includes at least one tumbler adapted to cooperate with the key element which enables the lock assembly to be selectively changed between the locked and unlocked configuration.

20. The locking system according to claim 18, wherein the key structure includes at least one tumbler adapted to cooperate with the key element which enables the lock assembly to be selectively changed between the locked and unlocked configuration.

21. The locking system according to claim 19, wherein the key element of the key structure is removable from the key structure.

22. The locking system according to claim 20, wherein the key element of the key structure is removable from the key structure.

23. The locking system according to claim 17, wherein the key structure further comprises a plurality of rotatable dials with indicia thereon and interior notches that when aligned place the lock assembly in the unlocked configuration.

24. The locking system according to claim 18, wherein the key structure further comprises a plurality of rotatable dials with indicia thereon and interior notches that when aligned place the lock assembly in the unlocked configuration.

25. A locking system for pets, the locking system comprising:
   an elongate leash with a pet-curing region and a handle region adapted to be held by a user,
   a pet collar with a locking region adapted to engage the pct-securing region of the elongate leash, and
   a lock assembly having a locked and an unlocked configuration, wherein the lock assembly is adapted to secure the pet-securing region of the elongate leash to the locking region of the pet collar when the locking assembly is in the locked configuration, and further adapted to release the pet-securing region of the elongate leash from the locking region of the pet collar when tie locking assembly is in tie unlocked configuration, wherein the collar is adapted to be used independent of the leash when the pet-securing region of the leash is not secured to the collar by the lock assembly, and wherein the lock assembly is further adapted to selectively secure the pet collar around the pet independently of the leash.

26. The locking system according to claim 25, wherein the pet-securing region includes a coupling structure adapted to be removably interlocked to the pet collar.

27. The locking system according to claim 25, wherein the lock assembly further comprises a key structure adapted to cooperate with a key element which enables the lock assembly to change from the locked to the unlocked configuration.

28. The locking system according to claim 27, wherein the key structure includes at least one tumbler adapted to cooperate with the key element which enables the lock assembly to be selectively changed between the locked and unlocked configuration.

29. The locking system according to claim 28, wherein the key structure includes at least one tumbler adapted to cooperate with the key element which enables the lock assembly to be selectively changed between the locked and unlocked configuration.

30. The locking system according to claim 27, wherein the key element of the key structure is removable from the key structure.

31. The locking system according to claim 27, wherein the key structure further comprises a plurality of rotatable dials with indicia thereon and interior notches that, when aligned, place the lock assembly in the unlocked configuration.

32. A locking system for pets, the system comprising:
   a leash including a pet-securing region and an end region including a coupling structure adapted to be releasably coupled to a pet collar; and
   means for locking together spaced-apart portions of the pet-securing region to define a closed perimeter sized to extend around a selected portion of a pet.

33. The system of claim 32, wherein the coupling structure is independently operable from the means for locking.

34. The system of claim 32, further including means for releasing the means for locking to free the spaced-apart portions.

35. The system of claim 34, further including a pet collar adapted to be releasably coupled to the coupling structure.

36. The system of claim 34, further including a pet collar adapted to be locked to the spaced-apart portions by the means for locking.

* * * * *

UNITED STATES PATENT AND TRADEMARK OFFICE
CERTIFICATE OF CORRECTION

PATENT NO. : 6,269,777 B1
DATED : August 7, 2001
INVENTOR(S) : Christian Prusia et al.

It is certified that error appears in the above-identified patent and that said Letters Patent is hereby corrected as shown below:

Column 11,
Line 56, after "lock structure," delete "and" and insert -- a -- therefor.
Line 58, delete "having" and insert -- has -- therefor.
Line 63, before "configured to prevent" insert -- and --.

Column 12,
Line 21, before "assembly is adapted" delete "locking" and insert -- lock -- therefor.
Line 24, before "assembly is adapted" delete "locking" and insert -- lock -- therefor.
Line 27, before "assembly is adapted" delete "locking" and insert -- lock -- therefor.

Column 13,
Line 11, delete "pet-curing" and insert -- pet-securing -- therefor.
Line 22, before "locking assembly" delete "tie" and insert -- the -- therefor.
Line 22, before "unlocked" delete "tie" and insert -- the -- therefor.

Column 14,
Lines 6-10, please delete Claim 29.

Signed and Sealed this

Eighth Day of October, 2002

Attest:

JAMES E. ROGAN
Attesting Officer        Director of the United States Patent and Trademark Office